US005683273A

United States Patent [19]

Garver et al.

[11] Patent Number: 5,683,273
[45] Date of Patent: Nov. 4, 1997

[54] MECHANICAL SPLICE CONNECTOR FOR CABLE

[75] Inventors: William Joseph Garver; Hung Viet Ngo, both of Harrisburg, Pa.

[73] Assignee: The Whitaker Corporation, Wilmington, Del.

[21] Appl. No.: 686,924

[22] Filed: Jul. 24, 1996

[51] Int. Cl.$^6$ ................................................ H01R 11/09
[52] U.S. Cl. ...................... 439/784; 439/462; 174/84 R
[58] Field of Search ................................. 439/784, 805, 439/462; 174/84 R, 84 C, 84 S

[56] References Cited

U.S. PATENT DOCUMENTS

| 981,586 | 1/1911 | Monosmith | 439/462 |
|---|---|---|---|
| 2,056,248 | 10/1936 | Buchanan | 439/784 |
| 2,166,458 | 7/1939 | Berndt | 174/94 |
| 2,463,145 | 3/1949 | Buchanan | 439/784 |
| 3,136,844 | 6/1964 | Petersen | 174/90 |
| 3,243,500 | 3/1966 | Rabinowitz | 174/84 |
| 3,515,794 | 6/1970 | Beinhaur | 174/90 |
| 3,681,512 | 8/1972 | Werner et al. | 174/84 R |
| 3,904,814 | 9/1975 | Dawson et al. | 174/84 R |
| 4,029,895 | 6/1977 | Scarborough | 174/138 F |
| 4,057,187 | 11/1977 | Cranston et al. | 228/107 |
| 4,179,583 | 12/1979 | Sergev | 174/21 R |
| 4,252,992 | 2/1981 | Cherry et al. | 174/90 |
| 4,362,352 | 12/1982 | Hawkins et al. | 439/788 |
| 4,745,239 | 5/1988 | Conrad | 174/72 R |
| 4,829,146 | 5/1989 | Duve | 174/94 R |
| 5,278,353 | 1/1994 | Buchholz et al. | 174/84 R |

FOREIGN PATENT DOCUMENTS 62-133381  8/1987  Japan ................... H01R 4/50

*Primary Examiner*—Neil Abrams
*Assistant Examiner*—T. C. Patel

[57] ABSTRACT

The invention comprises an electrical connector having a central member with a first securing portion. A pair of jaws extend from the central member. A conical member has a hollow interior and a second securing portion. The second securing portion engaging the first securing portion and the jaws being received within the hollow interior whereby as the securing portions are tightened together, the jaws are pushed together in order to grip a conductor therebetween.

12 Claims, 4 Drawing Sheets

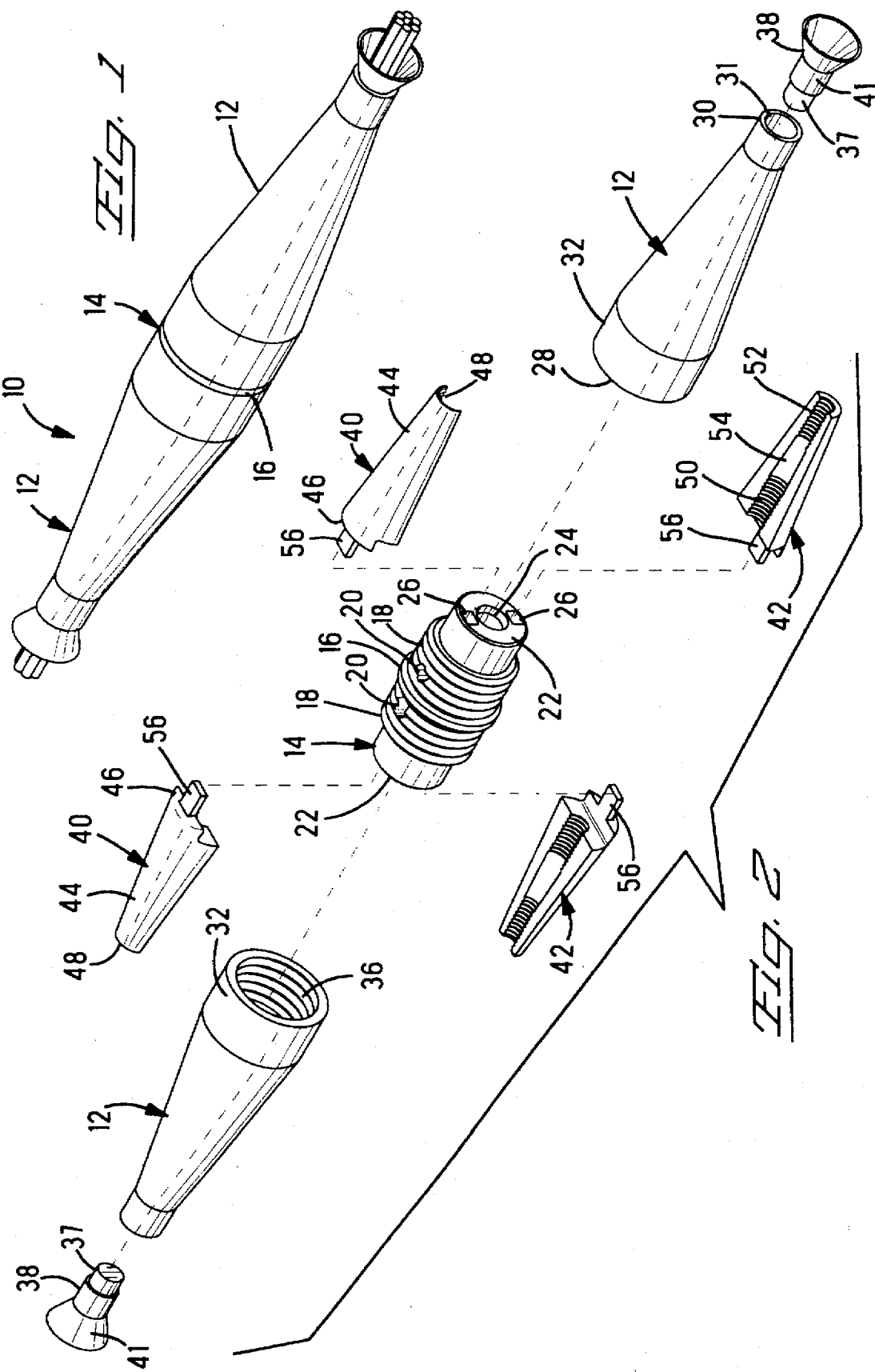

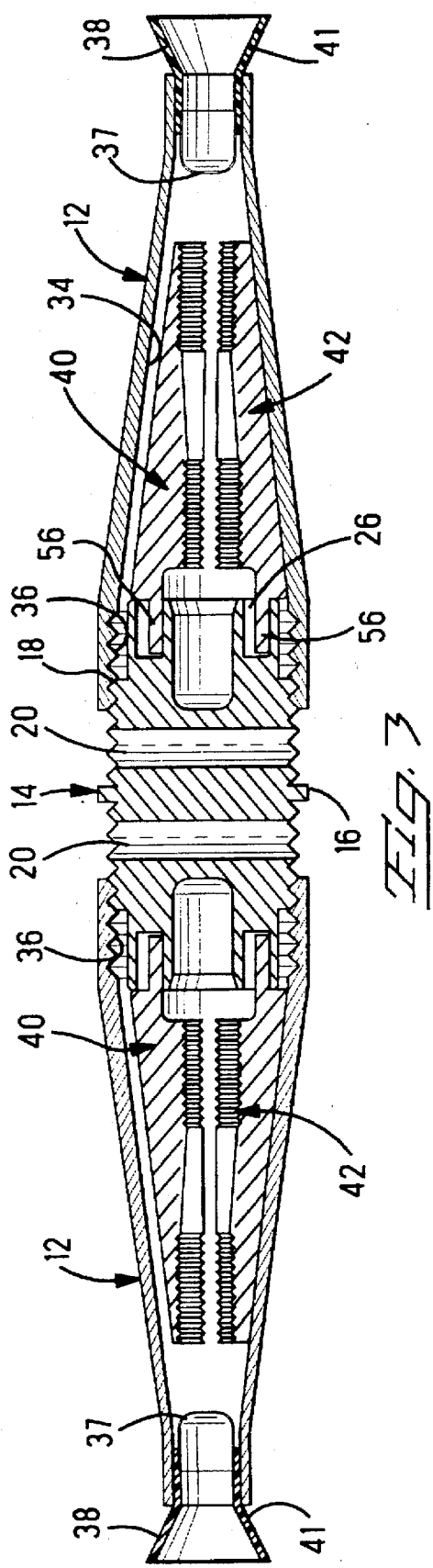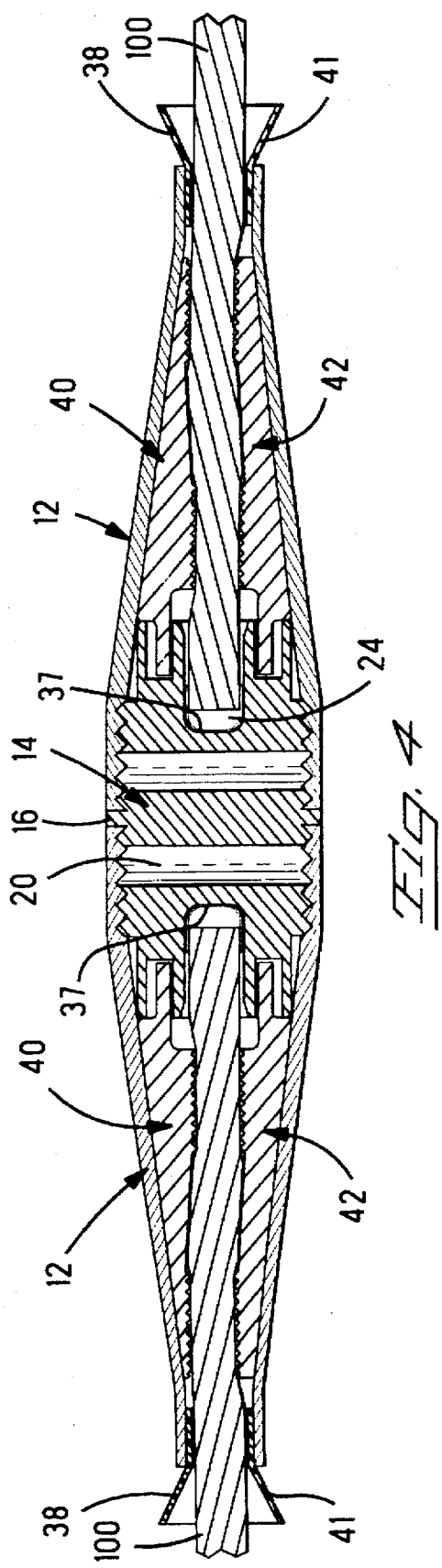

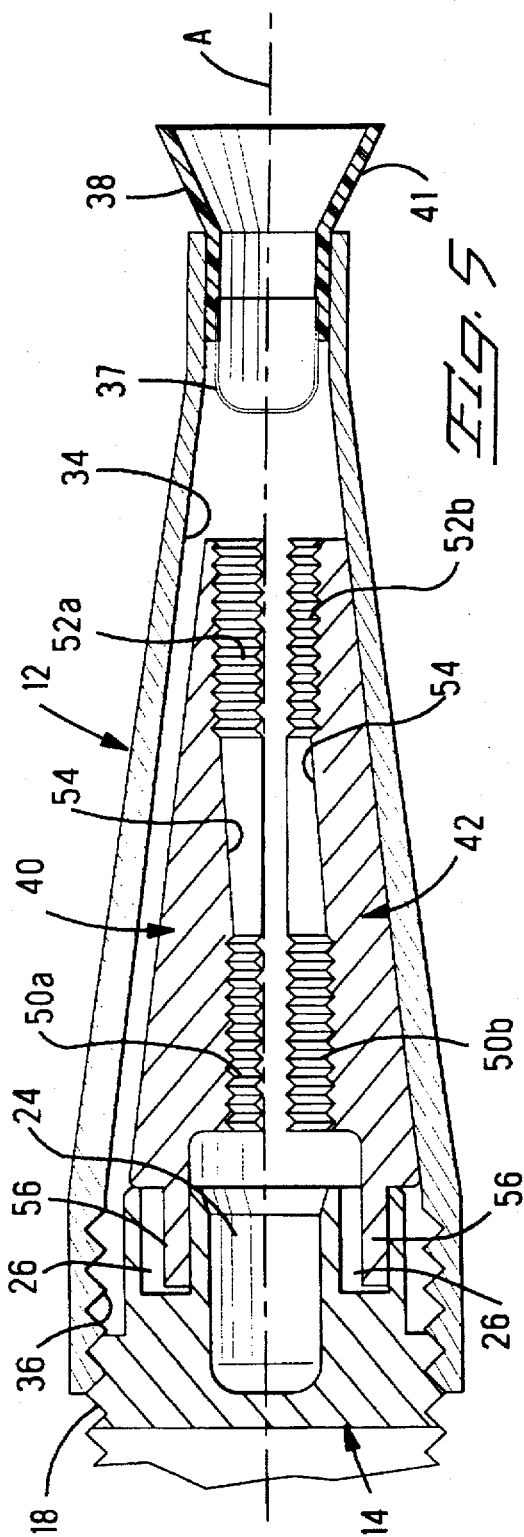
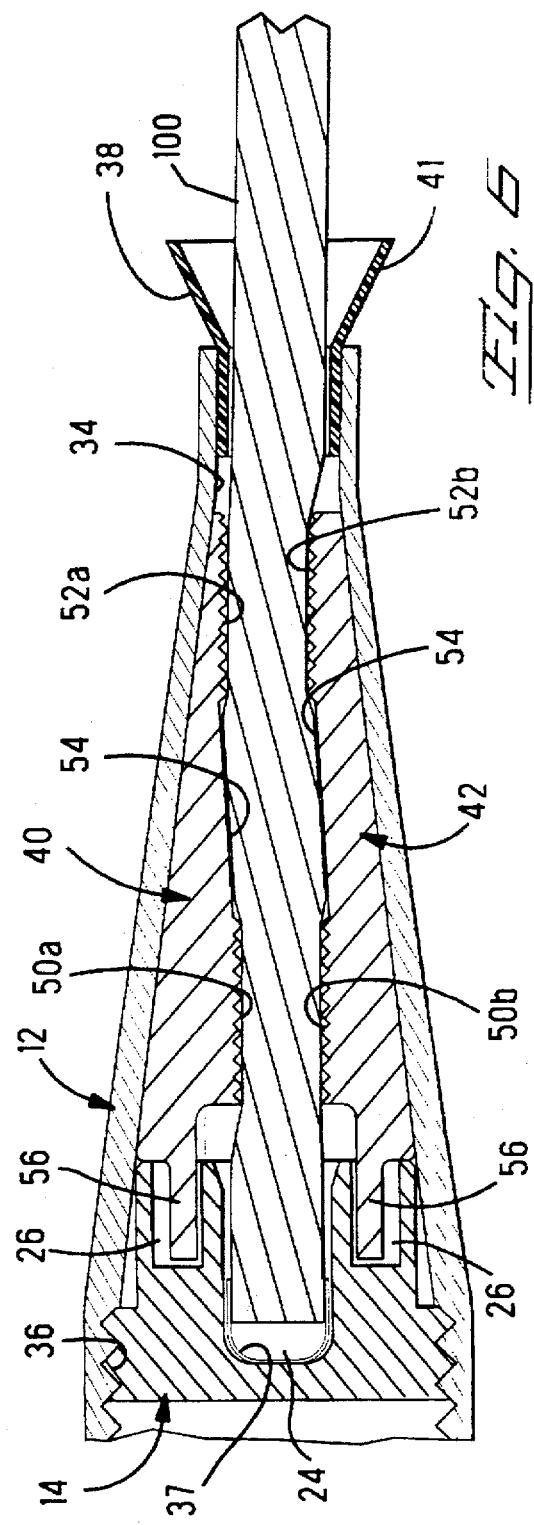
Fig. 5
Fig. 6

MECHANICAL SPLICE CONNECTOR FOR CABLE

FIELD OF THE INVENTION

The present invention is directed to a mechanical connector for splicing a pair of cables of the type used in electrical utility style overhead distribution and transmission systems.

BACKGROUND OF THE INVENTION

Overhead distribution of electrical cables typically are a part of the distribution portion of the power network. The cables are designated AAC, AAAC, or ACSR which stand for all aluminum conductor, all aluminum alloy conductor, or aluminum conductor steel reinforced, respectively; or they may be copper where cable diameters are in the range of three quarters to one inch. Transmission cables are typically stranded aluminum conductors about a steel reinforcing core (ACSR) having a diameter from three quarters of an inch and up.

There are a number of patents directed to splicing transmission type cable where the inventions rely upon devices which are activated in the same direction as the cable and have cable gripping jaws which grip on the cable in the direction of the tension of the cable. Many of these inventions are terminated by using internally fired or explosively activated devices or, alternatively, tool activated devices, or spring activated devices where either the explosive force, the tool activation, or the spring pushes a set of jaws outwardly thereby having them clamp down and around the cables to be connected.

U.S. Pat. No. 3,515,794 shows such an electrical connector which is tool activated. The connector has a hollow shell with a tapered internal surface. Along the internal surface of the hollow shell are a plurality of conductor gripping jaws which are compressible on the conductor at spaced locations along the internal surface. The connector is applied by use of a tool which forces the jaws of the connector along the tapered internal surface to compress the gripping jaws on the conductor.

In order to maintain a good electrical and mechanical grip on the conductors, it is necessary to provide tension along the conductors to keep the gripping jaws on the conductor at a location where they provide a good grasp on the conductor. In order to maintain this tension, it is necessary that both conductors are terminated within the electrical connector at the same time thereby ensuring that the force from the gripping jaws is maintained on the conductors.

In order to allow good electrical flow, contact interfaces must be obtained between several components of the connector, between the conductor and the gripping members, between the gripping members and the hollow shell, from the hollow shell to the other half of the connector and its components.

What is needed is an electrical connector that will provide a good gripping force on the conductors but will be able to be terminated to only one conductor at a time and still provide a good gripping action.

SUMMARY OF THE INVENTION

The invention comprises an electrical connector having a central member with a first securing portion. A pair of jaws extend from the central member. A conical member has a hollow interior and a second securing portion. The second securing portion engaging the first securing portion and the jaws being received within the hollow interior whereby as the securing portions are tightened together, the jaws are pushed together in order to grip a conductor therebetween.

BRIEF DESCRIPTION OF THE DRAWINGS

An embodiment of the present invention will now be described with reference to the accompanying drawings, in which:

FIG. 1 is an isometric view of the assembled connector of the present invention;

FIG. 2 is an exploded isometric view of the connector;

FIG. 3 is a cross-sectional view showing an unterminated connector;

FIG. 4 is a cross-sectional view showing the connector terminated;

FIG. 5 is an enlarged view similar to FIG. 3;

FIG. 6 is an enlarged view similar to FIG. 4; and

DETAILED DESCRIPTION OF THE INVENTION

Figure 7:
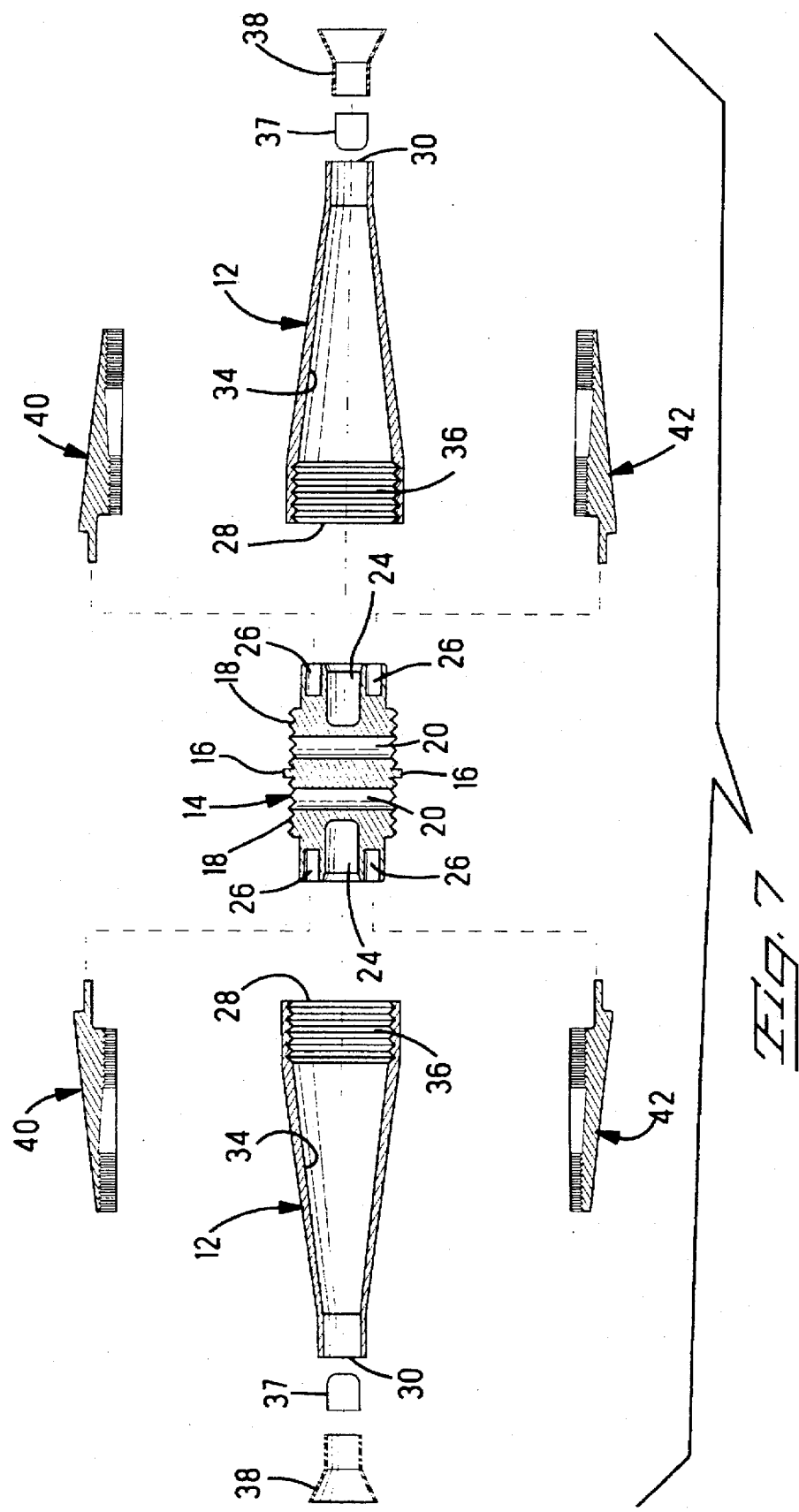
FIG. 7 is a exploded cross-sectional view of the connector.

FIG. 1 shows the electrical connector 10 of the present invention. The electrical connector is designed to electrically and mechanically connect two cables or conductors together, specifically the cables or conductors used in overhead distribution systems.

The electrical connector 10 includes two conical end sections 12 and a middle connecting section 14, see FIGS. 1 and 7. The connecting section 14 includes a central rib 16 and threaded portions 18 along either side of the central rib 16. Extending through each of the threaded portions 18 are tool holes 20, the purpose of which will be described more fully hereinafter. The connecting section 14 has two ends 22. Each of the ends has a cable receiving hole 24. On two sides of the hole 24 are tab slots 26.

The conical end sections 12 each have two ends 28, 30. End 28 has a large opening to engage the connecting section and an end 30 has a small opening 31 to receive the cable therein. Along end 28, the conical end sections 12 have outer, smooth, cylindrical gripping surfaces 32 for terminating and unterminating the connector. Alternatively, the gripping surfaces could be hexagonal, octagonal, or some other angled flat surfaces, shaped so that the conical end sections can be gripped with a tool. The conical end sections 12 are sloped inwardly from end 28 to end 30.

The conical end sections 12 have hollow interiors with sloped walls 34, see FIGS. 3 and 7. Along end 28, on the interior of the conical end sections 12 are threaded portions 36, see FIG. 2 and 3.

Received within the small openings 31 are end caps 38. These end caps 38 are used to keep the antioxidant gel within the interior of the conical end sections 12 until a cable is inserted therein. The end caps 38 are made of a lead-in part 41 and a soft, breakable part 37. The lead-in part 41 of the end caps 38 also provides for wire insertion in that the chamfered surfaces of the lead-in part 41 provide a guide for the cable into the end of the connector 10. When inserted, the cable breaks through the soft, breakable part 37 of the end cap 38 to provide access to the interior. When a cable is inserted into the end of the connector, the breakable part 37 is broken off onto the end of the cable 100. The breakable part 37 acts as a guide to help the cable move into the connector by keeping the end of the cable from fraying or stubbing on parts of the connector during insertion of the cable.

The electrical connector has a total of four jaws 40, 42, two jaws are received within each of the conical end sections 12. Each of the jaws have an outer, conical shaped surface 44 which is tapered from one end 46 to the other end 48. Each jaw 40, 42 has two gripping surfaces 50, 52 and a sloped surface 54 therebetween. The gripping surfaces and the sloped surface are disposed along a half-conical shaped channel, which, when two jaws 40, 42 are brought together form a cable receiving channel. Along end 46, each jaw 40, 42 has a tab 56.

The electrical connector 10 is assembled as is shown in FIG. 3. The jaws 40, 42 are aligned with the connecting section 14 by inserting the tabs 56 into the tab slots 26. The conical end section 12 is then secured to the connecting section 14 over the jaws 40, 42. The conical end section 12 is secured to the connecting section 14 by engagement of the threaded portion 18 with the threaded portion 36. The other side of the electrical connector 10 can be assembled in a similar manner. The conical end sections 12 are screwed on only enough to be secured to the connecting section 14. The tool holes 20 are left exposed. In this position, the jaws 40, 42 are not pressed together and they have room to be pushed apart to receive a cable therebetween.

The cables 100 are then inserted from either end of the electrical connector, as is shown in FIG. 4. It is possible for the connector 10 to be connected to one cable at a time. The cable 100 is pushed through the end cap 38, in between the jaws 40, 42, and is pushed in until the end of the cable and the breakable part 37 of the end cap 38 are received within the cable receiving hole 24 and abut against the connecting section 14. A tool, such as a screw driver or some other leveraging device, is inserted through the tool hole 20 on the opposite side of the connector from the side in which the cable has been inserted. The conical end section 12 is then screwed down by engaging the gripping surface 32, using the tool as a lever, and turning the conical end section 12 until the end 28 of the conical end section 12 engages the central rib 16.

As the conical end section 12 is turned and advanced toward the rib 16, the interior sloped walls 34 engage the outer surface 44 of the jaws and push the jaws closer to each other so that the gripping surfaces 50, 52 engage and secure the cable therebetween, as shown in FIG. 4. When the end 28 of the conical end section 12 engages the central rib 16, the cable will be secured within the connector.

The second cable can then be inserted into the other end of the connector to be secured within the connector in a similar manner. It is not possible to use the tool hole 20 to secure the second cable within the connector because it has been covered by the opposite conical end section. Therefore, it is necessary to use the gripping surface to assist in turning the second conical end section 12.

The details of the jaws 40, 42, and their interaction with the cables, will now be described with reference to FIGS. 5 and 6. FIG. 5 shows a center line "A" which extends through the middle of the electrical connector 10. The top jaw 40 has two gripping surfaces 50a, 52a. Each of the gripping surfaces 50a, 52a are parallel to the center line "A", the gripping surface 52a is further away from the center line "A" than the gripping surface 50a. The sloped surface is angled downwardly, as illustrated in FIG. 5, from the gripping surface 50a to the gripping surface 52a. The second jaw 42 also has two gripping surfaces 50b, 52b, each of which are parallel to the center line "A". The gripping surface 52b is closer to the center line than the gripping surface 50b. the sloped surface 54 is angled downwardly, as is illustrated in FIG. 5, from the gripping surface 52b to the gripping surface 50b.

The effect of having gripping surfaces at two levels is apparent from FIG. 6. The cable 100 follows a bent or curved pathway from the one set of jaws 52a, 52b to the second set of jaws 50a, 50b. The curvature of the pathway provides for a better grip on the cable to prevent pull outs. The forced bend in the cable provides for a better gripping force than if the gripping surfaces where in line with each other. The curvature of the pathway also provides for strain relief for the cable 100.

Prior to termination of the cables, it is advantageous to place an antioxidant gel within the connector to provide a good electrical connection between the various components of the connector. To this end, the antioxidant gel can be inserted between the cooperating gels. The antioxidant gel can also be inserted between the outer surface 44 of the jaws and the interior wall 34 of the conical end sections 12. The antioxidant gel will prevent oxidation of the surfaces of the components so that during termination, good electrical connection will be obtained.

The advantages of the electrical connector of the present invention are that the connector can be terminated to one cable at a time. It is not necessary to terminated two cables simultaneously. Further, the connector can be filled with an antioxidant gel to provide a good connection between the components. Also, the connector can be assembled very easily using readily available tools.

The electrical connector of the present invention and many of its attendant advantages will be understood from the foregoing description. It is apparent that various changes may be made in the form, construction, and arrangement of parts thereof without departing from the spirit or scope of the invention or sacrificing all of its material advantages.

What is claimed is:

1. An electrical connector, comprising:
    a central member having a first securing portion;
    a pair of jaws extending from the central member; and
    a conical member having a hollow interior and a second securing portion, the second securing portion engaging the first securing portion and the jaws being received within the hollow interior whereby as the securing portions are tightened together, the jaws are pushed together in order to grip a conductor therebetween;
    the pair of jaws having two gripping surfaces for engaging the conductor, a center line extends longitudinally through the conical member, each of the gripping surfaces are parallel to the center line, one of the two gripping surfaces being closer to the center line than the other of the two gripping surfaces, forming a curved pathway for receiving the conductor.

2. The electrical connector of claim 1, wherein the first and second securing portions are first and second threaded portions.

3. The electrical connector of claim 1, wherein the hollow interior has a first conical shaped surface and wherein each of the pair of jaws have a second outer conical shaped surface, the first conical shaped surface engaging the second outer conical shaped surface during termination to push the pair of jaws together.

4. The electrical connector of claim 1, wherein each of the pair of jaws have a tab, the central member has two tab slots, the tab on each of the pair of jaws being received within the tab slots.

5. The electrical connector of claim 1, wherein the central member has two first threaded portions with a rib therebetween, the threaded portions being used to secure two of the conical members.

6. The electrical connector of claim 5, wherein the central member has two tool holes extending through the first threaded portions, the tool holes receiving a leveraging tool therein assist in terminating to the conductor.

7. An electrical connector, comprising:

a central member having a first engaging section;

a pair of jaws extending from the central member, the jaws each having an outer conical surface, the jaws forming a channel therebetween;

a conical member having a second engaging section and a hollow interior, the jaws being received within the hollow interior, the second engaging section interacting with the first engaging section to secure the conical member to the central member and terminate to a cable, during termination the hollow interior engages the conical outer surface on the jaws, pushing the jaws together to terminate to a cable received within the channel;

the pair of jaws having two gripping surfaces for engaging the conductor, a center line extends longitudinally through the conical member, each of the gripping surfaces are parallel to the center line, one of the two gripping surfaces being closer to the center line than the other of the two gripping surfaces, forming a curved pathway for receiving the conductor.

8. The electrical connector of claim 7, wherein the first and second engaging portions are first and second threaded portions.

9. The electrical connector of claim 7, wherein the hollow interior has a second conical shaped surface, the second conical shaped surface engaging the outer conical shaped surface on the pair of jaws during termination to push the pair of jaws together.

10. The electrical connector of claim 7, wherein each of the pair of jaws have a tab, the central member has two tab slots, the tab on each of the pair of jaws being received within the tab slots.

11. The electrical connector of claim 7, wherein the central member has two first threaded portions with a rib therebetween, the threaded portions being used to secure two of the conical members.

12. The electrical connector of claim 11, wherein the central member has two tool holes extending through the first threaded portions, the tool holes receiving a leveraging tool therein to assist in terminating to the cable.

* * * * *